United States Patent [19]

Chaikowsky

[11] Patent Number: 5,657,684

[45] Date of Patent: Aug. 19, 1997

[54] POPCORN VENDING MACHINE

[75] Inventor: Peter Chaikowsky, Kentwood, Mich.

[73] Assignee: Rowe International, Inc., Grand Rapids, Mich.

[21] Appl. No.: 515,816

[22] Filed: Aug. 16, 1995

[51] Int. Cl.[6] ............................................. A23L 1/18
[52] U.S. Cl. ........................ 99/323.7; 99/323.9; 99/323.8
[58] Field of Search ................... 99/323.9, 323.6, 99/323.8, 323.5, 357, 323.7; 222/361, 762, 367, 356; 221/263, 264, 254, 72, 96

[56] References Cited

U.S. PATENT DOCUMENTS

| | | | |
|---|---|---|---|
| D. 309,919 | 8/1990 | Byrley | D20/1 |
| D. 334,950 | 4/1993 | Wyman et al. | D20/4 |
| D. 343,198 | 1/1994 | Lindén et al. | D20/3 |
| 3,253,532 | 5/1966 | Jones | 99/323.6 X |
| 3,498,502 | 3/1970 | Breitenstein et al. | |
| 3,641,916 | 2/1972 | McDevitt et al. | |
| 4,171,667 | 10/1979 | Miller et al. | 99/323.6 |
| 4,307,657 | 12/1981 | Avery | 99/323.7 |
| 5,018,615 | 5/1991 | Byrley | 99/323.6 X |
| 5,309,825 | 5/1994 | Pinone | 99/323.6 |
| 5,419,238 | 5/1995 | Pinone | 99/323.6 |

*Primary Examiner*—Reginald Alexander
*Attorney, Agent, or Firm*—Van Dyke, Gardner, Linn & Burkhart, LLP

[57] ABSTRACT

A popcorn vending apparatus according to the invention includes a cup dispenser for dispensing a cup in an area accessible by a purchaser, a cooker assembly for cooking corn kernels and dispensing the cooked kernels to a cup in the purchaser accessible area, and a corn dispenser for dispensing a measured quantity of corn to the cooker. The dispenser includes a hopper and a transporting mechanism for transporting measured quantities of corn from the hopper to the cooker. The transport mechanism includes a tubular member and a rotatable open spiral in the tubular member. The transporting mechanism includes a precision drive which is capable of rotating the open spiral a predetermined number of revolutions. There is also a flavor dispenser for dispensing flavoring in a cup in the purchaser accessible area. The flavor dispenser includes a dispensing head and a support for moving the head over a cup in the dispensing area.

35 Claims, 11 Drawing Sheets

POPCORN VENDING MACHINE

BACKGROUND OF THE INVENTION

This invention relates generally to a food vending machine and, more particularly, to a popcorn vending apparatus which dispenses freshly cooked kernels of popcorn and user selectable flavorings in a cup upon demand by a purchaser.

Fresh popcorn vending machines are faced with various difficulties because the quality, including moisture content, of each uncooked kernel affects the resulting volume of the dispensed product. In order to provide a satisfactory vend, it is necessary that the cooked popcorn completely fill a cup, dispensed by the machine to a user accessible area, and any selected flavorings must be evenly dispensed throughout the volume of product. In order to accomplish these results, it is desirable to maintain the uncooked corn in a sealed hopper and dispense a precisely measured quantity to a cooker irrespective of fluctuations in line voltages and the like. The apparatus must perform unattended with bursts of frequent use followed by lengthy periods of non-use. The cooker should quickly and consistently cook the corn kernels which are transported to the cup in the user accessible area.

Because the usage of the apparatus varies considerably, from repeated sequential vends to periods of non-use, it is difficult to produce consistent cooking times and temperatures for the kernels. When vends occur back-to-back, the cooking vessel may retain heat between batches, which may result in excessive cooking temperatures. On the other hand, when the apparatus has not been utilized for a lengthy period, the cooking time is much longer because of the time required to heat the vessel to a temperature suitable to cook the kernels. This results in a difficulty in maintaining a consistent vend, which is further aggravated by the difficulty of dispensing a precisely measured quantity of kernels from a sealed hopper to the cooker without adding undue expense to the apparatus.

Flavorings are typically applied to the cooked kernels as they are deposited in the cup utilizing a head with one or multiple nozzles which receive flavorings pumped from a flavor storage container. A flavoring is usually an emulsion, which tends to settle out over a period of time spanning one or more days. In order to maintain proper consistency of the flavoring, it has been necessary for the operator to access the apparatus frequently in order to shake the flavoring containers and thereby maintain the components in properly mixed consistency. Because of the extensive labor required to access each machine and perform this service, the operator may choose to lengthen the intervals between service, which may result in a poor quality of the dispensed flavoring which, in turn, may result in an unsatisfactory vend. Another difficulty with flavorings is that, if the flavoring is dispensed only in the middle of the cup, the flavoring tends to descend down the middle of the popcorn without adequate coverage of the popcorn. One solution to this problem has been to provide an offset nozzle location and a turntable in order to rotate the popcorn batch under the nozzle and thereby disperse the flavoring. The difficulty with such approach is that the turntable tends to accumulate flavorings which then get on the bottom of the cup of subsequent vends. This provides an unsatisfactory experience to the purchaser who may get soiled by the flavoring on the outside of the cup.

Another problem with popcorn vending machines is that the large cup required for the vend is a desirable target of thieves and difficult to protect because of the unattended nature of the apparatus. It would be desirable to inhibit thieves from gaining access to the cup dispenser of the apparatus between vends.

SUMMARY OF THE INVENTION

The present invention provides a popcorn vending apparatus that is capable of providing consistent high quality vends of popcorn to achieve exceptional customer satisfaction irrespective of the frequency of use of the apparatus. This is accomplished without requiring extensive manual attendance to the apparatus.

A popcorn vending apparatus according to the invention includes a cup dispenser for dispensing a cup in an area accessible by a purchaser, a cooker assembly for cooking corn kernels and dispensing the cooked kernels to a cup in the purchaser accessible area, and a corn dispenser for dispensing a measured quantity of corn to the cooker. The dispenser includes a hopper and a transporting mechanism for transporting measured quantities of corn from the hopper to the cooker. According to an aspect of the invention, the transporting mechanism includes a tubular member and a rotatable open spiral in the tubular member. The tubular member has an inner diameter that is not substantially greater than the outer diameter of the open spiral. In accordance with another aspect of the invention, the tubular member and open spiral are oriented substantially vertically wherein the uncooked kernels are transported upwardly from the hopper to the cooker. In accordance with yet another aspect of the invention, the transporting mechanism includes a precision drive which is capable of rotating an auger element, such as an open spiral, a predetermined number of revolutions, or portions thereof. This structure provides an exceptionally accurate movement of kernels through the tubular member. This facilitates the depositing of a measured quantity of corn in the cooker. Preferably, the open spiral is manufactured with a low-friction surface finish in order to facilitate ease of slide movement between the spiral and the kernels. Advantageously, the spiral member may be manufactured with significantly less expense than conventional augers, without performance degradation, and is easier to clean.

A popcorn vending apparatus according to another aspect of the invention includes a flavor dispenser for dispensing flavoring in a cup in the purchaser accessible area. The flavor dispenser includes a dispensing head and a support for moving the head over a cup in the dispensing area. The head may be moved in a particular pattern, such as a circle, figure eight, or the like. The support may include a stationary bracket, a motor mounted to the stationary bracket, and an arm mounted to the bracket. A crank between the motor and one end of the arm moves the head, which is mounted to the opposite end of the arm. This structure removes the motor from the area immediately surrounding the dispensing head. The apparatus may further include a control for the motor which is capable of positioning the arm in a home position, at least partially covering a portion of the cup dispenser, between vends of popcorn. This provides a means for inhibiting tampering with the cup dispenser between vends. This object may further be enhanced by enlarging the portion of the arm which is positioned to cover the portion of the cup dispenser.

According to yet another aspect of the invention, the cooker assembly includes a vessel, a heater, and a fan for supplying heat to the vessel. A control is provided for the heater and the fan which modulates the fan in a manner that maintains a desired temperature in the vessel during cooking of the corn. Indeed, the fan may be further utilized, in this manner, to provide rapid cooling of the vessel between vends in order to avoid heat buildup with multiple back-to-back vends.

According to yet another aspect of the invention, at least one flavor storage container is connected with the flavor dispenser in a manner that the contents of the storage container may be selectively supplied to the flavor dispenser. The storage container includes a mixer in order to mix the contents of the storage container. The control intermittently actuates the mixer in order to avoid separation of the components of the flavorings.

These and other objects, advantages, and features of this invention will become apparent upon review of the following specification in conjunction with the drawings.

DESCRIPTION OF THE PREFERRED EMBODIMENT

Figure 1:
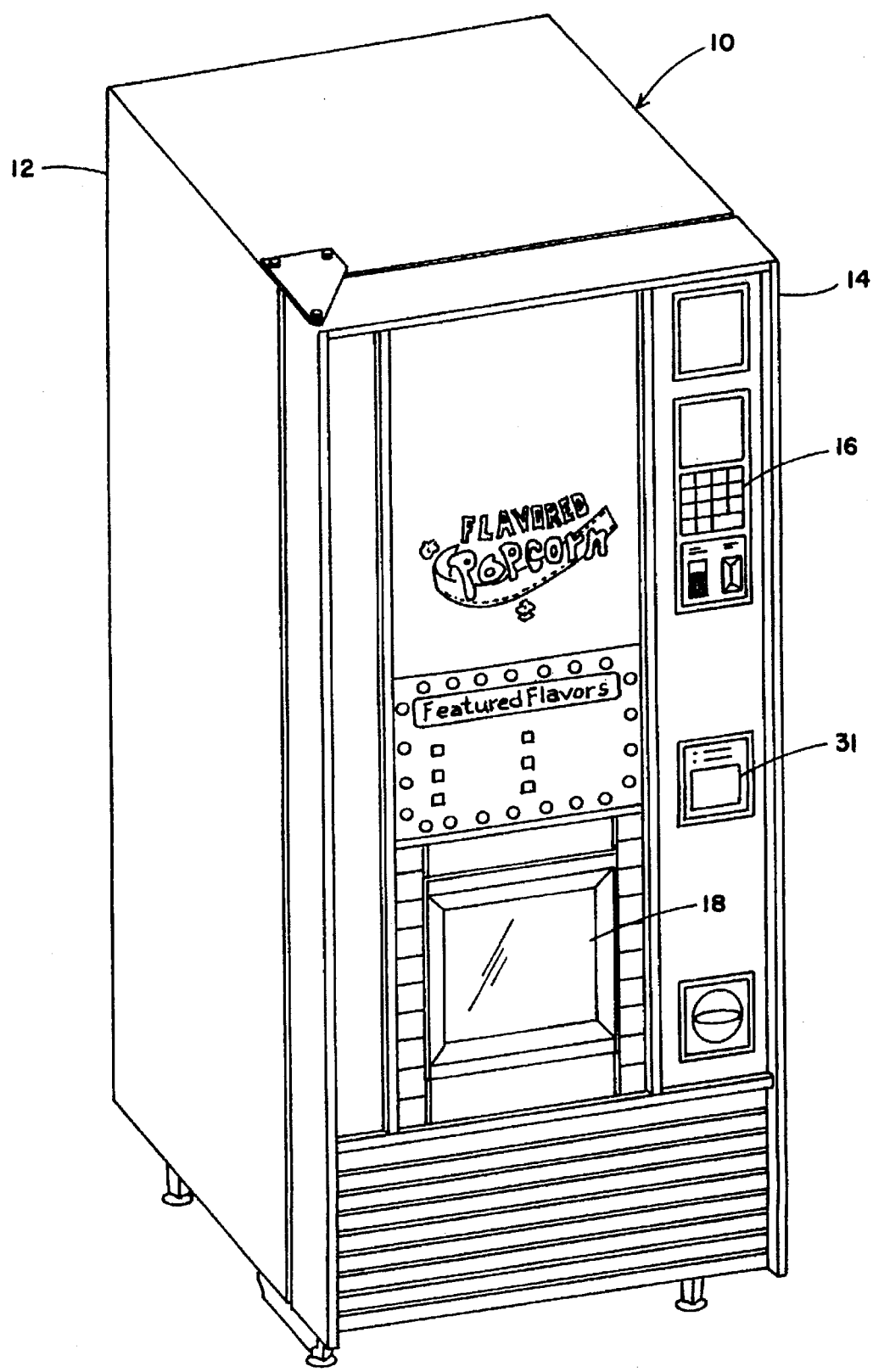
FIG. 1 is a perspective view of a popcorn vending apparatus according to the invention.
Figure 2:
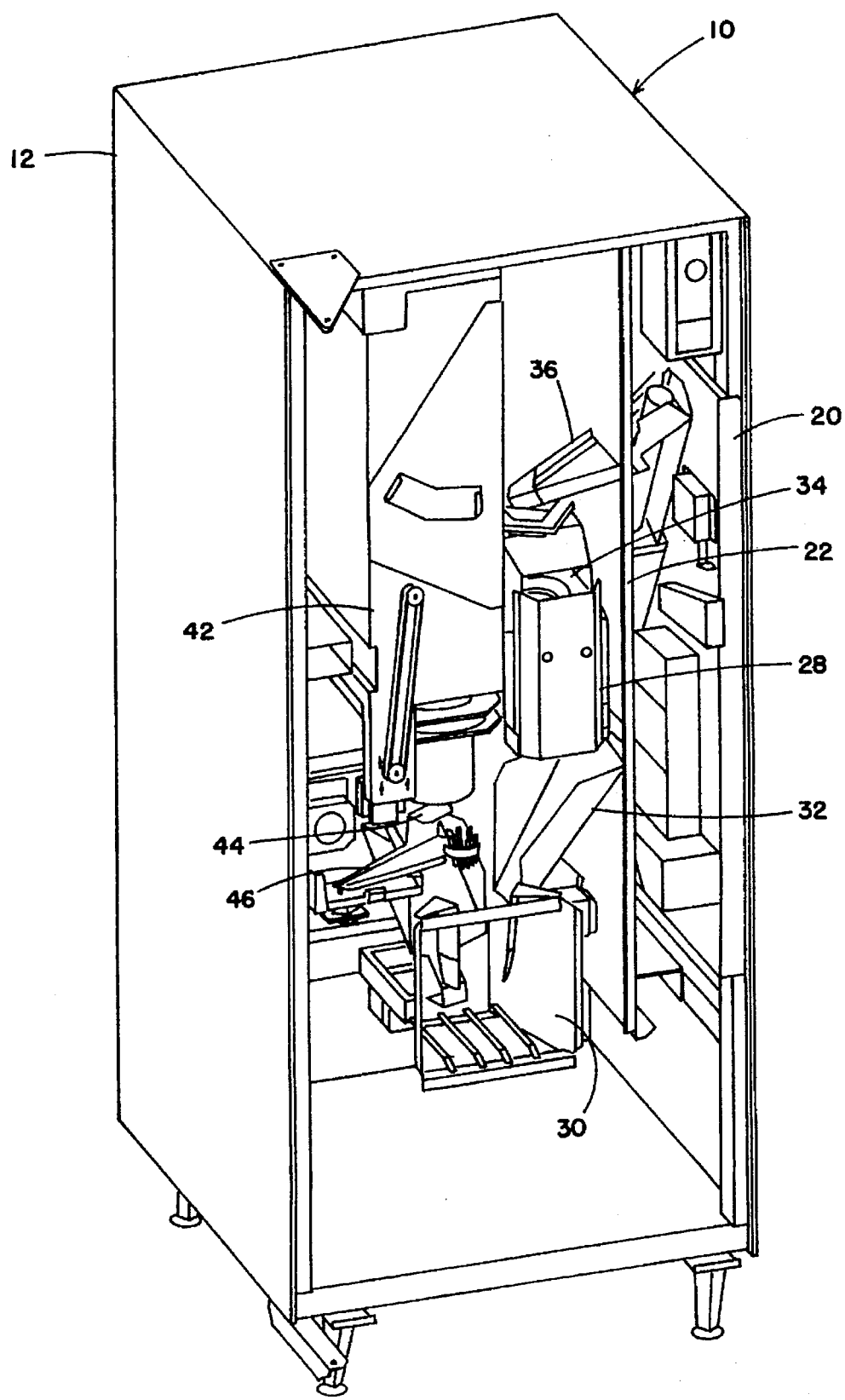
FIG. 2 is the same view as FIG. 1 with the front panel removed to reveal internal components thereof.
Figure 3:
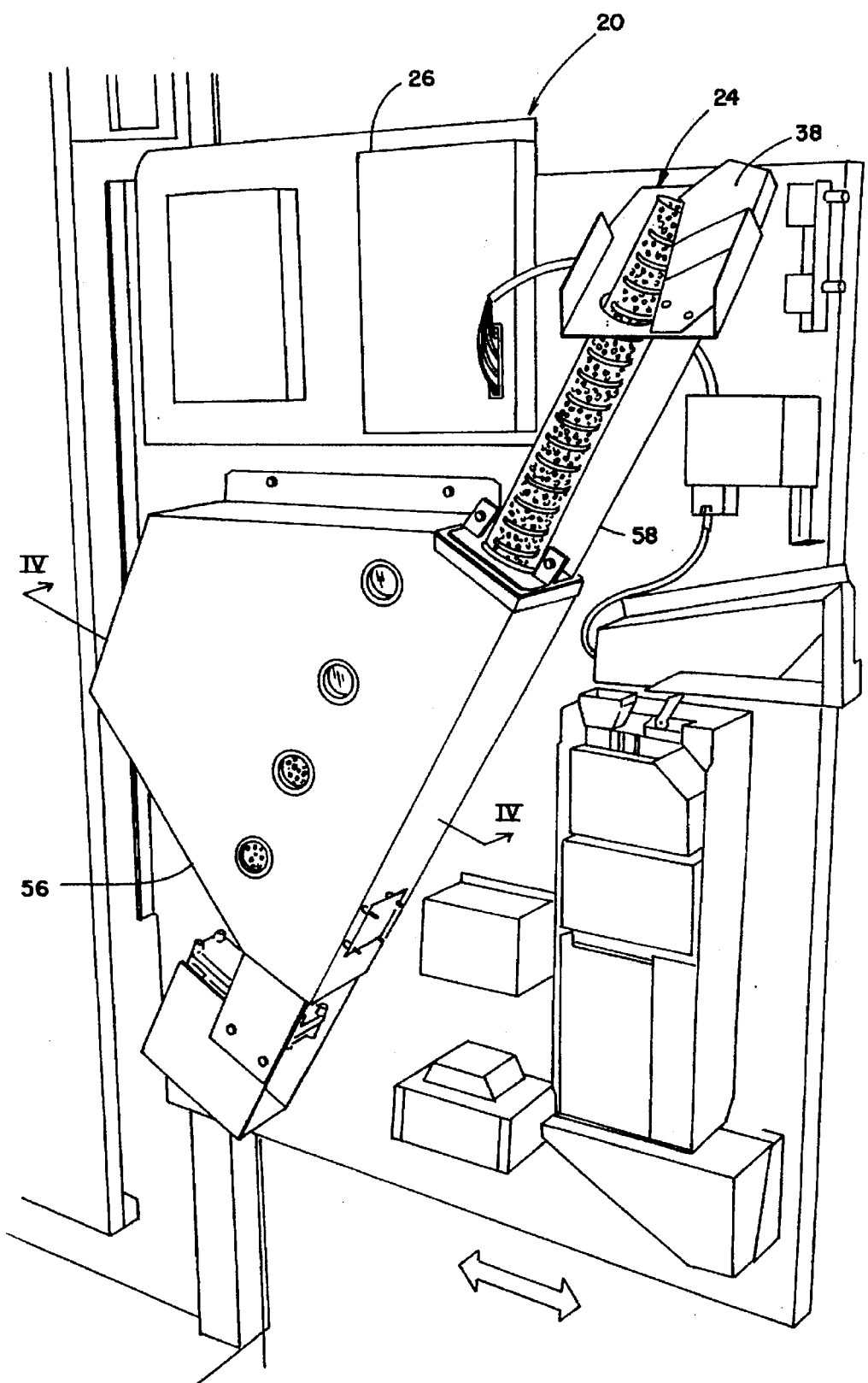
FIG. 3 is a perspective view of a movable panel, mounting a corn dispenser, pulled out of the cabinet in an access position.
Figure 4:
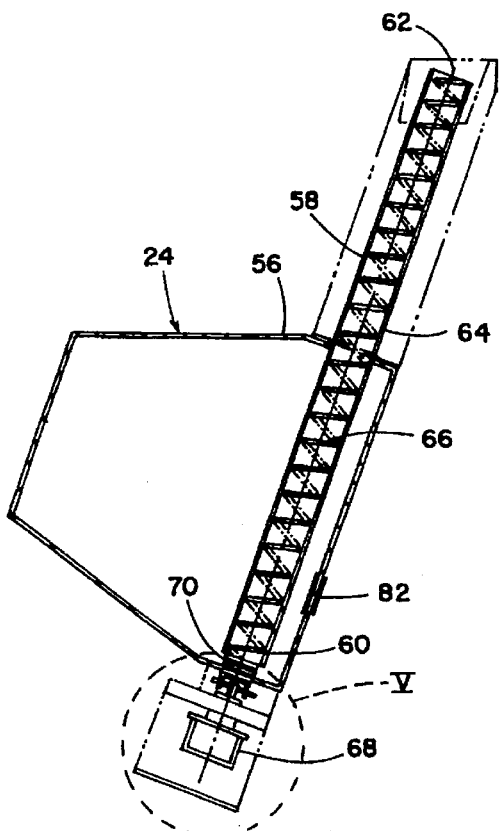
FIG. 4 is a sectional view taken along the lines IV—IV in FIG. 3.
Figure 5:
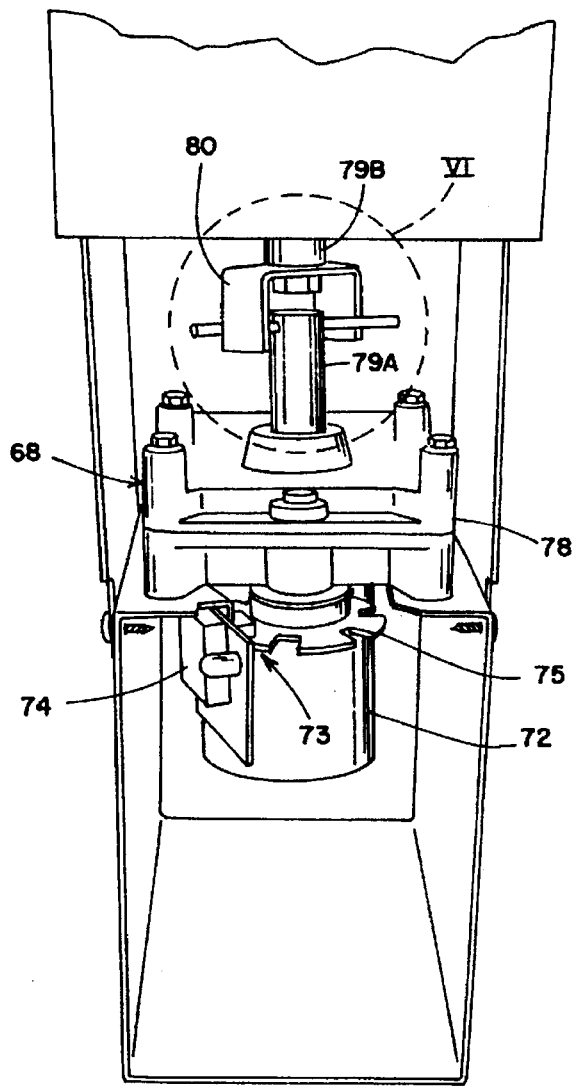
FIG. 5 is an enlarged view of the area illustrated at V in FIG. 4.
Figure 6:
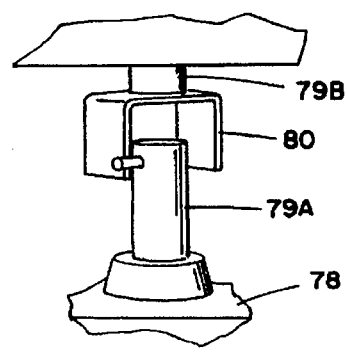
FIG. 6 is an enlarged view of the area designated VI in FIG. 5.
Figure 13A:
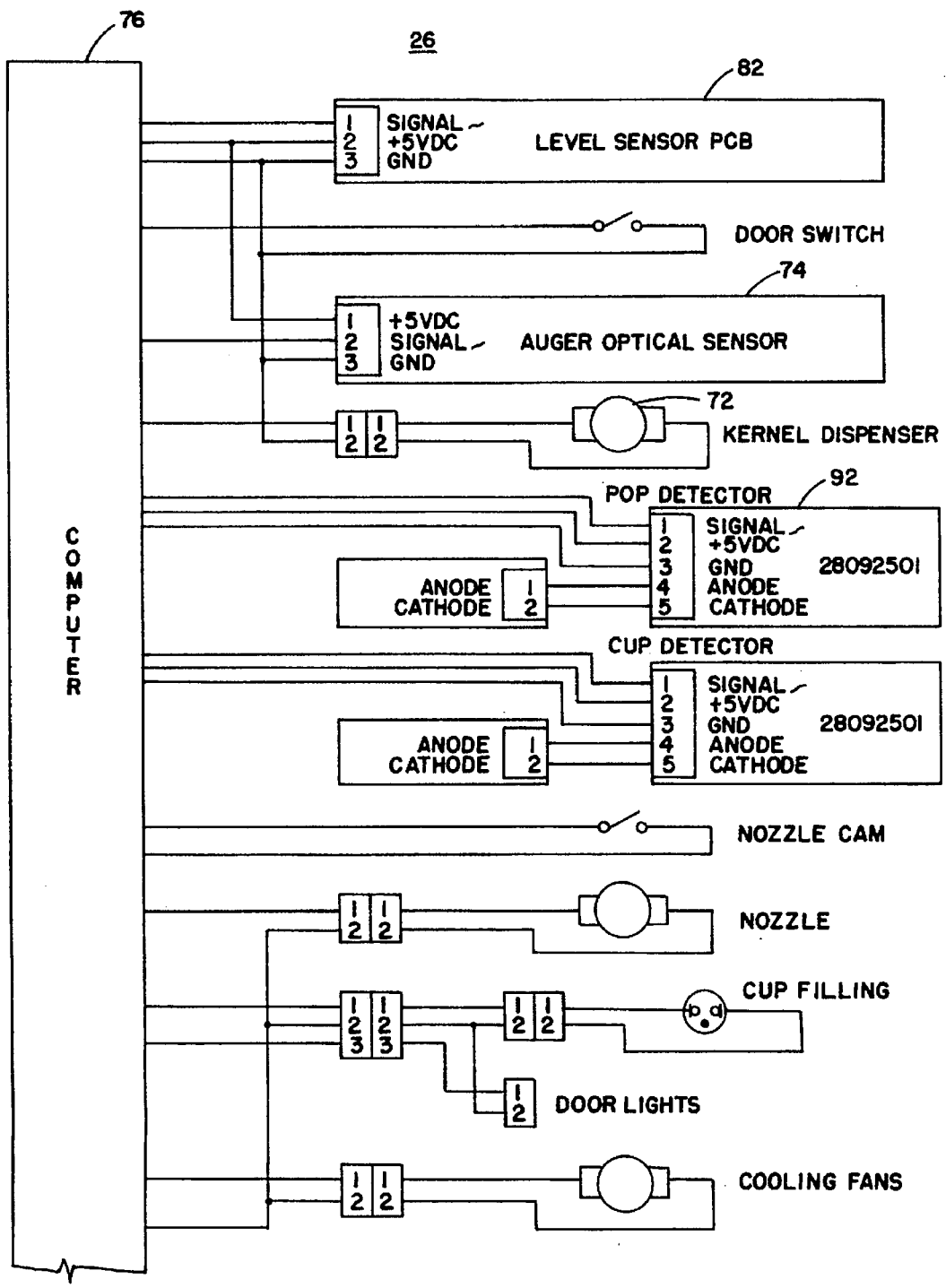
FIGS. 13a and 13b are schematic block diagrams of an electronic control assembly according to the invention.
Figure 13B:
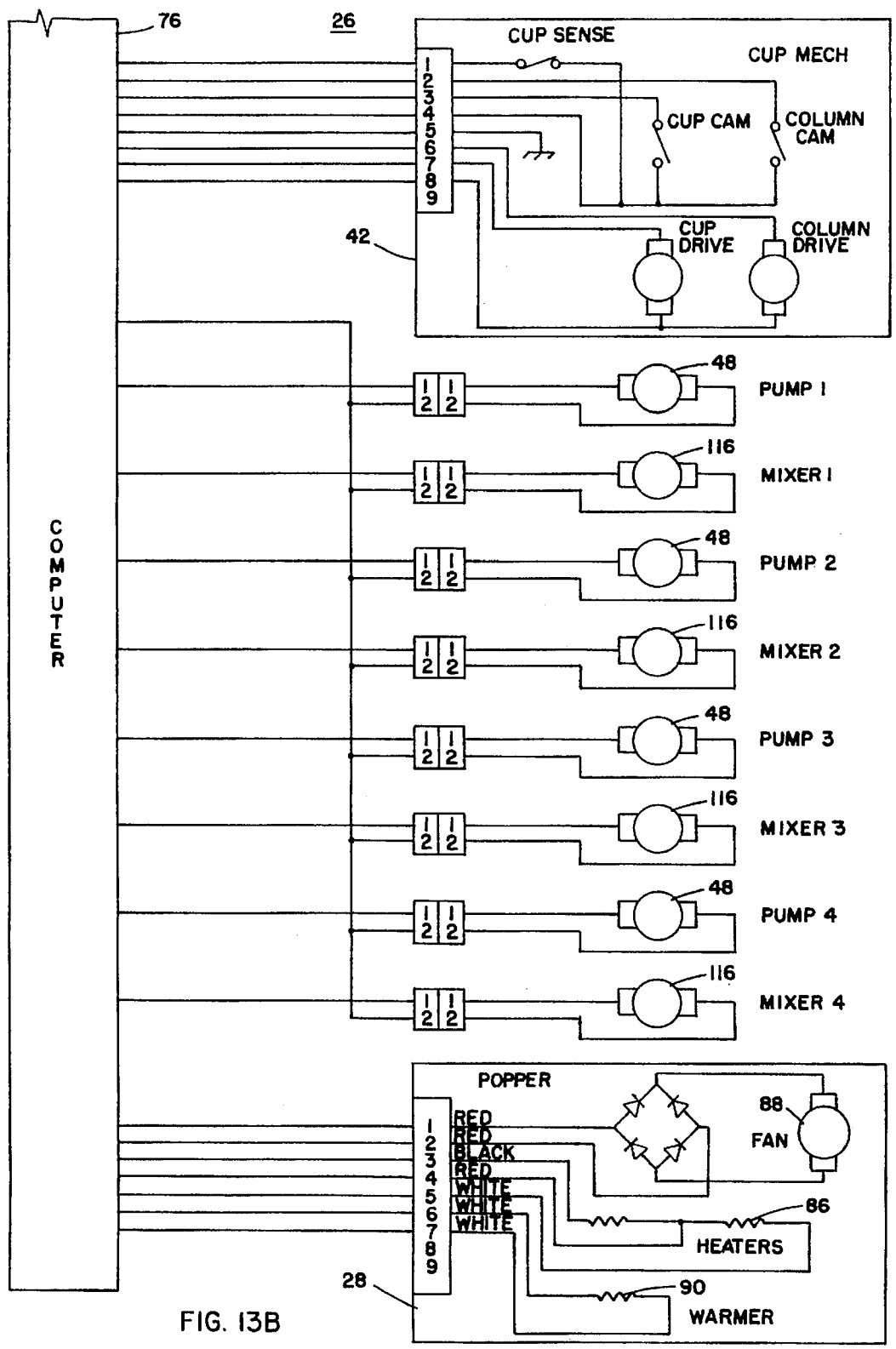

Referring now specifically to the drawings and the illustrative embodiments depicted therein, a popcorn vending apparatus 10 includes a cabinet enclosure 12 having an open front that is selectively closed by a front panel 14 (FIG. 1). Front panel 14 includes a user selection keypad 16 and a user accessible area 18 wherein popcorn is dispensed. A movable panel 20, which may be pulled forward, and a stationary panel 22, mount components in a manner that provides easy access to the components of the apparatus for operator service with front panel 14 in a open position (FIG. 2). Movable panel 20 includes a corn dispenser assembly 24 and a control assembly 26 mounted thereon (FIG. 3). Control assembly 26 includes a microcomputer 76, such as an 8-bit microprocessor and associated peripheral circuits, and a plurality of input and output devices, of which some are illustrated in FIGS. 13a and 13b. In the illustrated embodiment, microcomputer 76 is a commercial product manufactured by Rowe International, Inc. of Grand Rapids, Mich. under Model Number 5900.

Panel 22 includes a cooker assembly 28 and a dispensing cavity 30 mounted thereon. A guide chute 36 guides movement of uncooked corn from a discharge plate 38 of corn dispenser 24 to an inlet opening 40 of cooker assembly 28. A guide chute 32 guides cooked popcorn from a discharge opening 34 of cooker assembly 28 to dispensing cavity 30. A cup dispenser 42 includes a discharge opening 44 from which large disposable cups are dispensed to dispensing cavity 30 utilizing conventional techniques. A flavor dispenser assembly 46, which will be described in more detail below, is generally disposed between discharge opening 44 of cup dispenser 42 and dispenser cavity 30. A plurality of peristaltic pumps 48 each provide motive force to pump a flavoring emulsion from a flavor storage container 50 to one or more nozzles 52 positioned on a head 54 of flavor dispenser assembly 46. Such peristaltic pump, which is well known in the art, is advantageous because the transported material is confined to the tube, which may be readily removed for cleaning purposes. A coin or bill acceptor 31 is provided on front panel 14 in order to accept money in exchange for a vend of popcorn.

Corn dispenser 24 includes a hopper 56, for storing a quantity of uncooked corn kernels. The hopper, preferably, is enclosed in order to retain the moisture content of the corn (FIGS. 3–6). A transport mechanism 58 is provided for transporting corn kernels from hopper 56 to discharge plate 38. Transport mechanism 58 has a lower portion 60 positioned at the bottom of hopper 56 and a discharge portion 62 opening to discharge plate 38. Transport mechanism 58 includes a tubular member 64, having an inner diameter of predetermined size, and an open spiral auger 66 positioned in tube 64. Open spiral member 66 has an outer diameter which is substantially the same size as the inner diameter of tubular member 64, less a clearance factor. The clearance factor may be in a range of from approximately ten thousandths of an inch to approximately one eighth of an inch. In the illustrative embodiment, tubular member 64 is made from a transparent material, such as a lucite or plexiglass, or in order to allow the operator to observe the operation of the transport mechanism. However, other materials, including non-transparent materials, may be utilized. In the illustrated embodiment, open spiral 66 is formed from a round metal rod, preferably having a low-friction surface finish in order to facilitate free movement between the open spiral and the corn kernels being moved up transport mechanism 58. Open spiral 66 may be made from a material having a smooth finish, such as stainless steel, or a carbon steel plated with a suitable finish. Other materials, including those coated with teflon and other low-friction surfaces, may be utilized. Additionally, other wire shapes, such as square, flat, or the like, may be used instead of round wire stock.

Transport mechanism 58 additionally includes a precision drive assembly 68, which is operated by control 26 in order to turn auger 66 a precise number of revolutions, or portions thereof. Lower portion 60 of transport mechanism 58 includes a gap 70 between tubular member 64 and the bottom wall of hopper 56. This provides an area for kernels of corn to enter tubular member 64. In the illustrated embodiment, drive assembly 68 includes a DC motor 72 and a shaft encoder 73. In the illustrated embodiment, shaft encoder 73 includes an optical sensor 74 and a rotating serrated disk 75. The encoder 73 is for the purpose of providing an input to a microcomputer 76 representative of the number of increments of rotations of the shaft of motor 72. Drive assembly 68 additionally includes a speed reducer 78, in order to increase the torque output of motor 72, and a coupling 80, which accommodates offset between output shaft 79a of speed reducer 78 and input shaft 79b of open spiral auger 66. Corn dispenser 24 may additionally include a material level sensor 82 in order to shut down apparatus 10 and alert the operator when the level of corn kernels in hopper 56 is below a desired level.

When it is desired to vend popcorn, control 26 actuates motor 72 while monitoring encoder 73 in order to rotate open spiral 66 a predetermined number of rotations or portions thereof. Remarkably, even though spiral 66 is open, the spiral engages enough corn kernels and moves them up tubular member 64 in a consistent fashion, enhanced by a slippage between the surface of the spiral and the corn kernels. Furthermore, it has been found that corn dispenser 24 dispenses a measured quantity of corn kernels to cooker assembly 28 substantially irrespective of the level of corn kernels in hopper 56. Because open spiral 68 is rotated by a precision drive assembly, the number of rotations or portions thereof of the spiral is precisely controlled substantially independent of voltage fluctuations and the like. Advantageously, the spiral can be manufactured for a relatively modest amount and is easy to clean.

Figure 7:
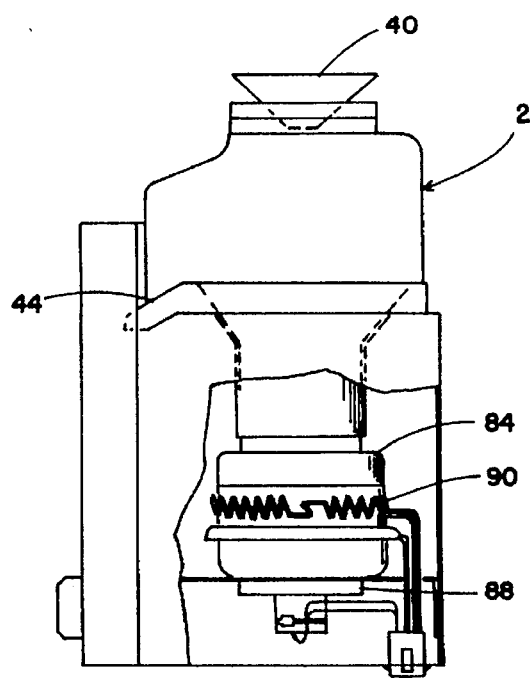
FIG. 7 is a side elevation of the cooker assembly according to the invention, with portions of the wall removed to illustrate internal components thereof.
Figure 8:
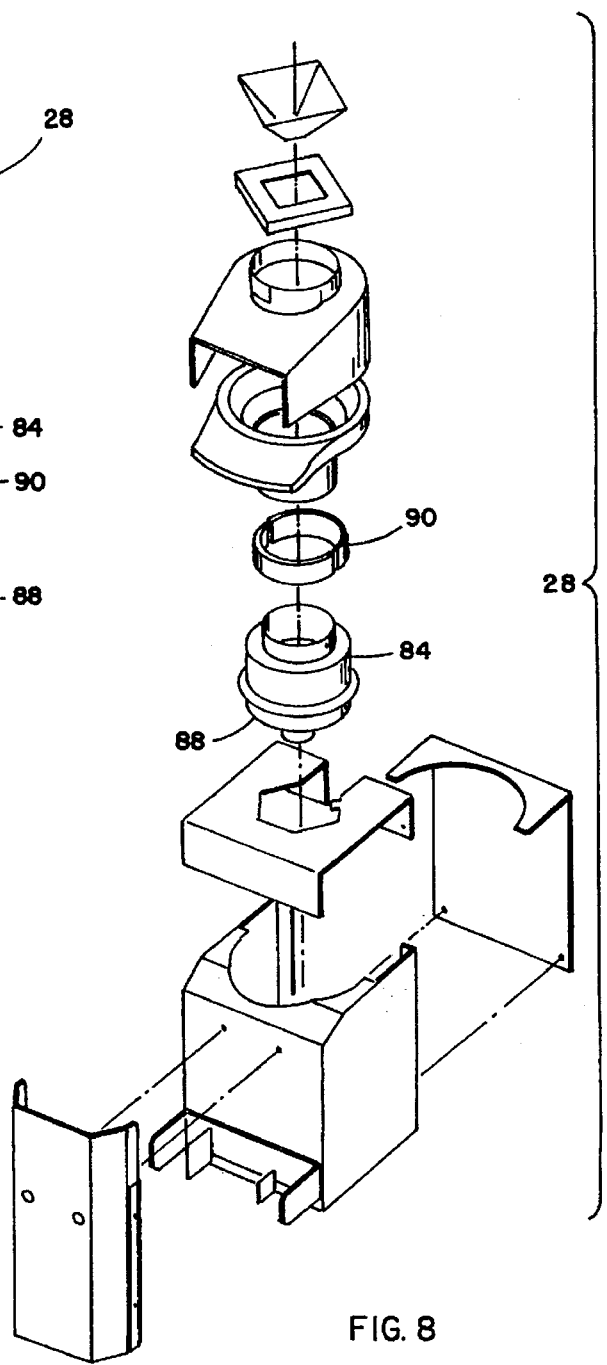
FIG. 8 is an exploded perspective view of the cooker assembly in FIG. 7.

Cooker assembly 28 includes a cavity 84, within which uncooked kernels are deposited, for cooking, through inlet 40. An internal heater 86 (not shown in FIGS. 7 and 8) supplies heat to cavity 84. A fan 88, which is modulated by control 26 in order to vary the flow of air across heater 86, regulates the temperature within cavity 84. Control 26 may receive an input from a thermostat (not shown) and modulate fan 88 by either varying the speed of the fan within a range, which includes 0 rpms at the low end, or pulses the fan ON and OFF according to a duty cycle. According to one alternative embodiment, control 26 may monitor the voltage and/or current of heater 86, to derive an indication of heat supplied to cavity 84, to thereby modulate fan 88. According to another alternative embodiment, control 26 may modulate fan 88 according to a predetermined pattern. For example, control 26 may initiate the vend process by energizing heater 86 and fan 88 at normal speed until the pop detector detects popping. The fan may then be cycled. After a predetermined period of time, equal to a normal cooking cycle, control 26 may then turn the fan on a high speed to cool down cavity 84.

Cooker assembly 28 additionally includes a lower wattage band heater 90, which is independently controlled of heater 86. Heater 90 is a warmer heater, which is for the purpose of maintaining the temperature within cavity 84 at a consistent temperature in between vends of popcorn. In this manner, the cavity may be rapidly brought up to cooking temperature by energization of heater 86 upon the user selecting a vend. It has been discovered that this feature reduces the average vend time from approximately four minutes to approximately two minutes.

After a measured quantity of uncooked kernels have been deposited by transport mechanism 58 in cavity 84 of cooker assembly 28, heater 86 and fan 88 are energized in order to cook the corn kernels. Because warmer heater 90 has maintained the temperature of cavity 84 at a predetermined temperature, such as 180 degrees, the temperature in cavity 84 will rapidly rise. Fan 88 is modulated by control 26 in one of the manners previously described in order to maintain the temperature within cavity 84 at a predetermined cooking temperature. Fan 88 may be kept running after the vend cycle is complete in order to rapidly lower the temperature of cavity 84 back to the warming temperature maintained by warmer heater 90. This avoids an accumulation of heat in cavity 84, which may tend to cook the kernels too rapidly, when several back-to-back vends are carried out. When the kernels of corn begin to "pop," a pep detector 92 detects the motion and actuates flavor dispenser 46 in a manner which will be described below.

Figure 9:
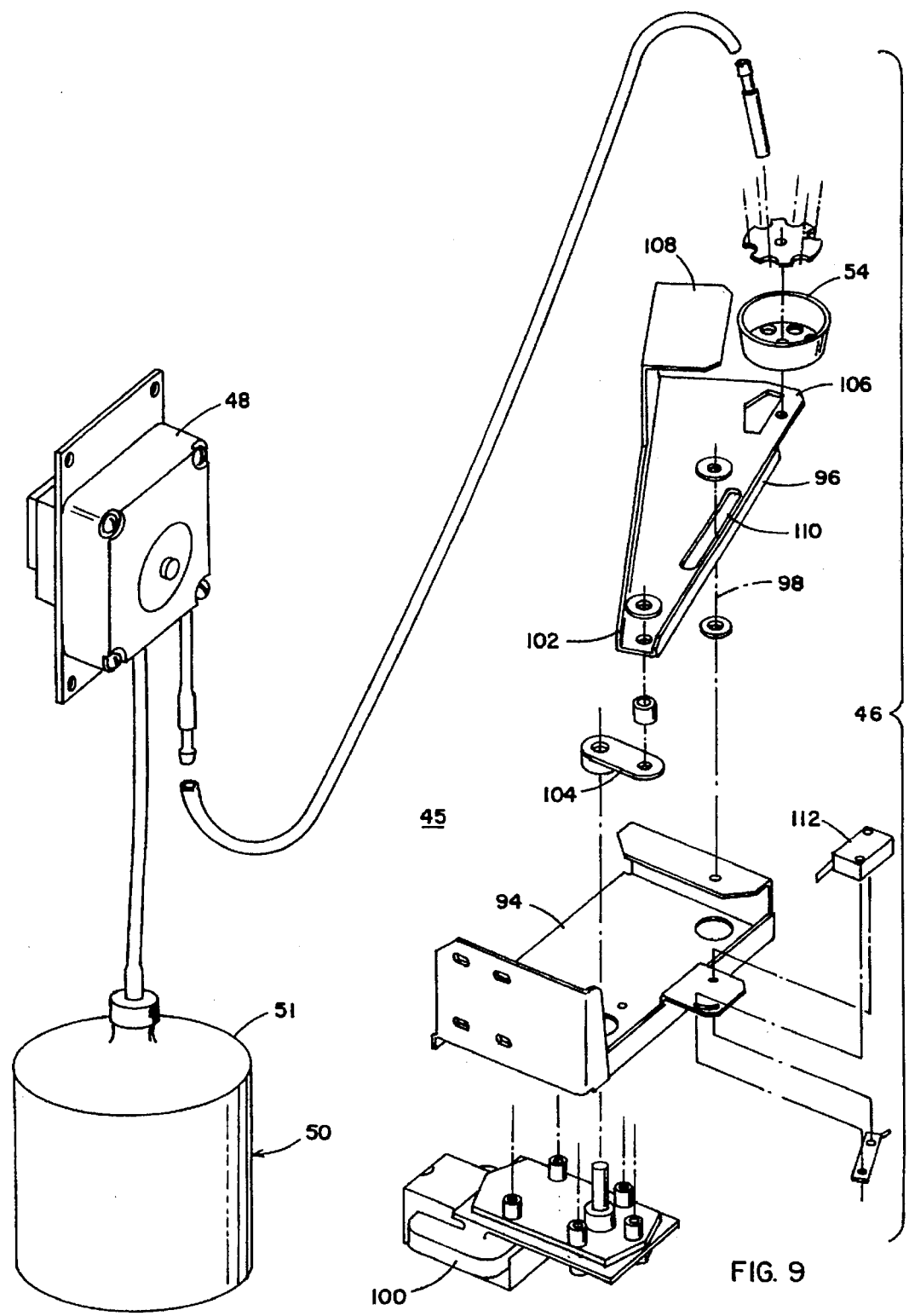
FIG. 9 is an exploded perspective view of a flavor dispensing system according to the invention.

A flavor dispensing system 45 includes a flavor dispenser assembly 46 for dispensing flavoring, a plurality of flavor storage containers 50 (only one of which is illustrated in FIG. 9), each for storing a flavoring, and a plurality of pumps 48 (only one of which is shown in FIG. 9), each for conveying a flavoring from an associated storage container to dispensing assembly 46. Flavor dispenser assembly 46 includes a stationary bracket 94, which is mounted within cabinet 12, and an arm 96 which is mounted to move about a pivot 98 of bracket 94. Flavor dispenser assembly 46 further includes a motor 100 which is connected with an end portion 102 of arm 96 by way of a crank 104. Dispenser head 54 is mounted at an opposite end 106 of arm 96. End 106 includes a returned flange 108 which is selectively positionable adjacent discharge opening 44 of cup dispenser 42. Pivot 98 is engaged within an elongated slot 110 of arm 96. In this manner, when motor 100 is energized, the rotation of crank 104 causes head 54 to move in a circular motion. Flavor dispenser assembly 46 further includes a limit switch 112 which defines a home position for end 106 of arm 96. Alternatively, head 54 may be moved in other patterns, such as figure eight, or the like, by selection of suitable mechanical linkages.

Figure 10:
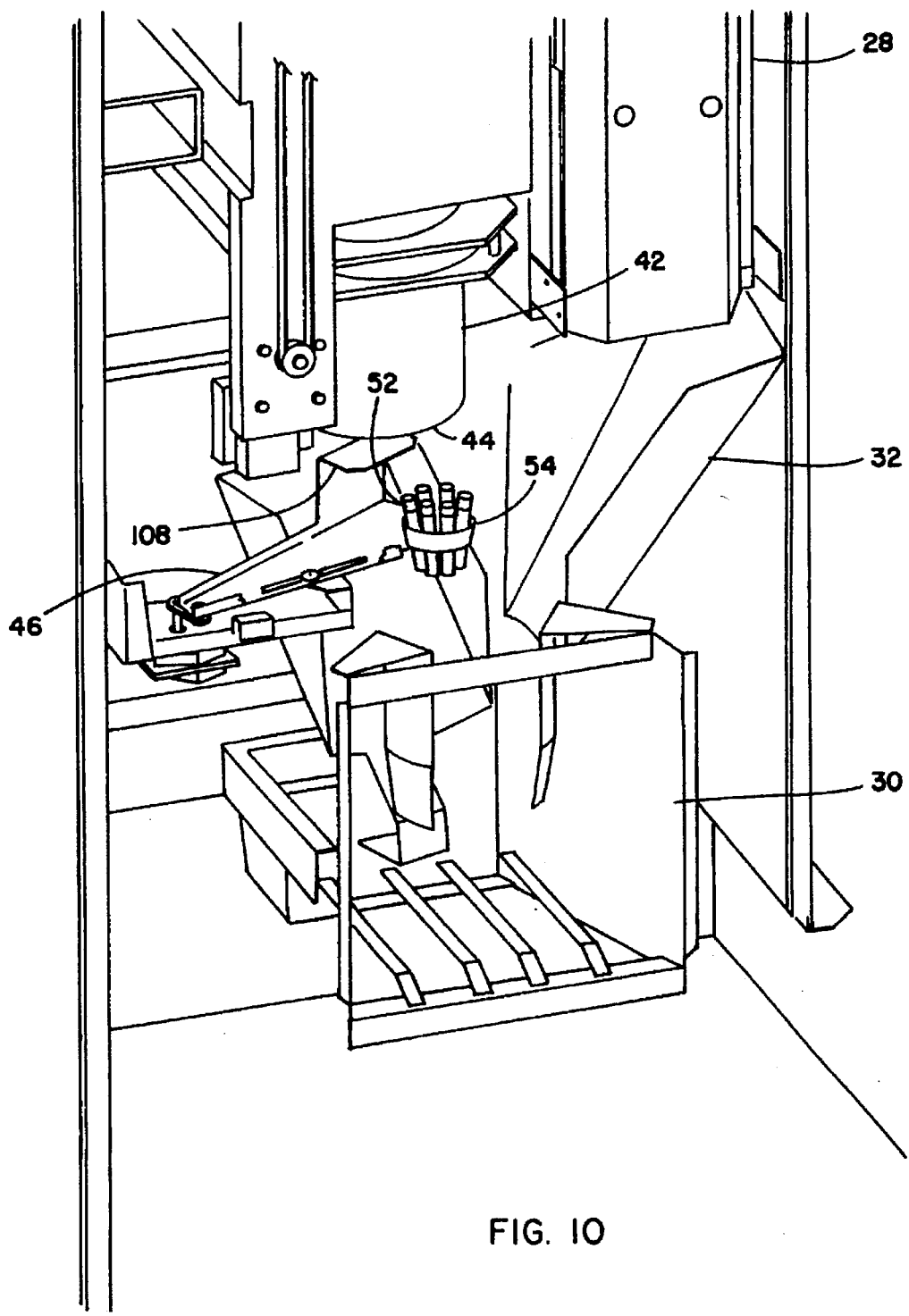
FIG. 10 is a perspective view illustrating the flavor dispenser assembly in a rest position.
Figure 11:
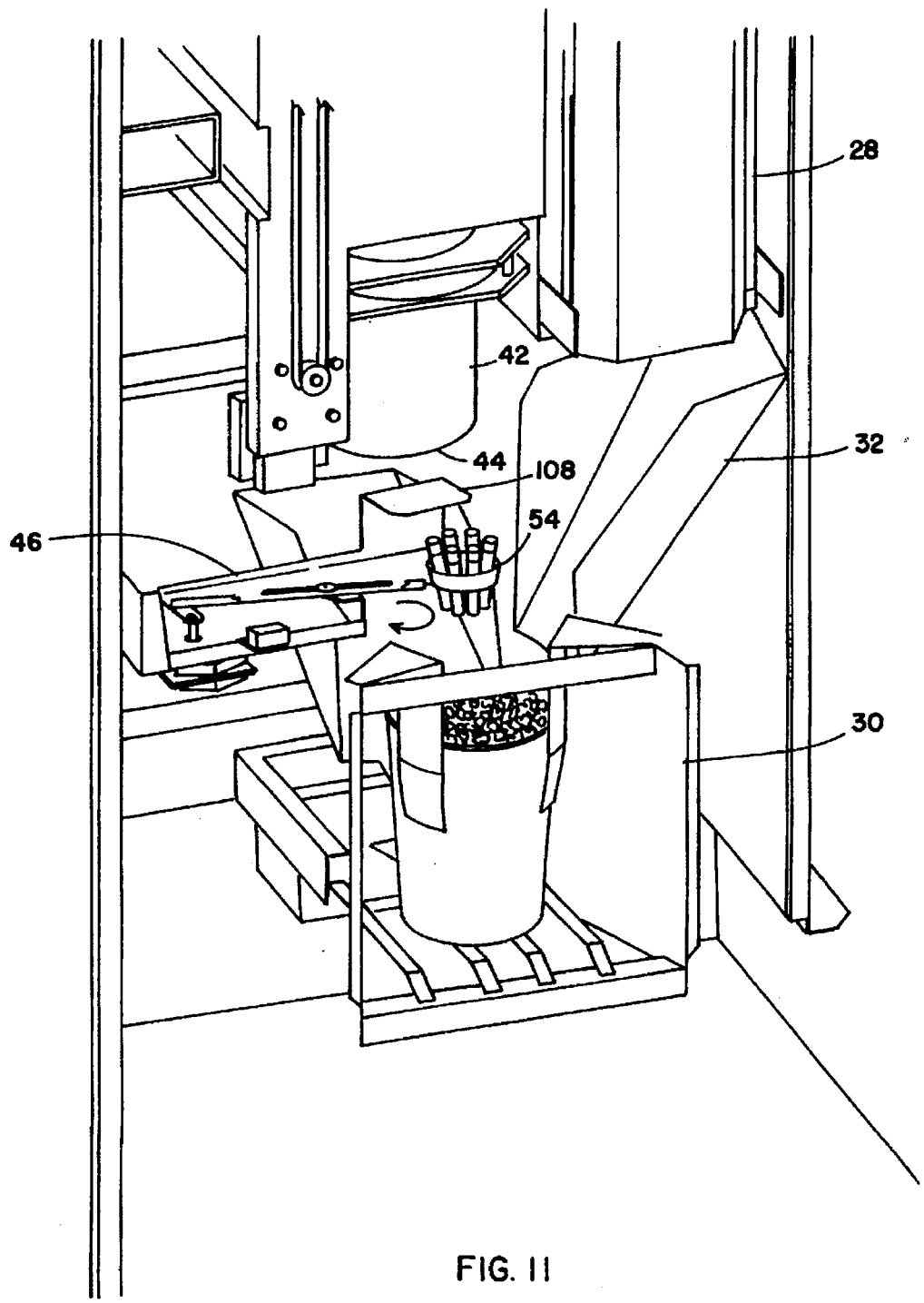
FIG. 11 is the same view as FIG. 10 illustrating the dispenser assembly in a dispensing position.

In between vends of popcorn, end 106 of arm 96 is parked in its home position adjacent discharge opening 44 of cup dispenser 42 illustrated in FIG. 10. The presence of arm 96 including flanged portion 108 inhibits an individual from inserting their arm in dispensing cavity 30 and removing cups from cup dispenser 42. When a purchaser selects a vend, control 26 actuates motor 100 in order to rotate end 106, and, therefore, head 54, one revolution during which a cup is dispensed by dispenser 42 to dispensing cavity 30. Arm 96 is returned to the home position until pop detector 92 detects the movement of cooked kernels being transported down chute 32 into the cup positioned within dispenser cavity 30. At such time, control 26 again energizes motor 100 which causes dispenser head 54 to continuously move in a circular pattern as illustrated in FIG. 11. Concurrently, control 26 also actuates the pump 48 associated with the flavor selected by the user with keypad 16. This causes the selected flavoring to be drizzled from one or more nozzles 52 as head 54 is moved in the continuous circular motion. This causes the flavoring to be dispensed uniformly upon the cooked kernels as they are deposited in the cup. Preferably, the dispensing of flavoring may be delayed to begin when the cup is partially full, such as one-half full. Alternatively, flavoring may be dispensed throughout substantially the entire vend. When the vend is complete, control 26 de-energizes motor 100 when limit switch 112 indicates that end 106 of arm 96 is in its home position.

Figure 12:
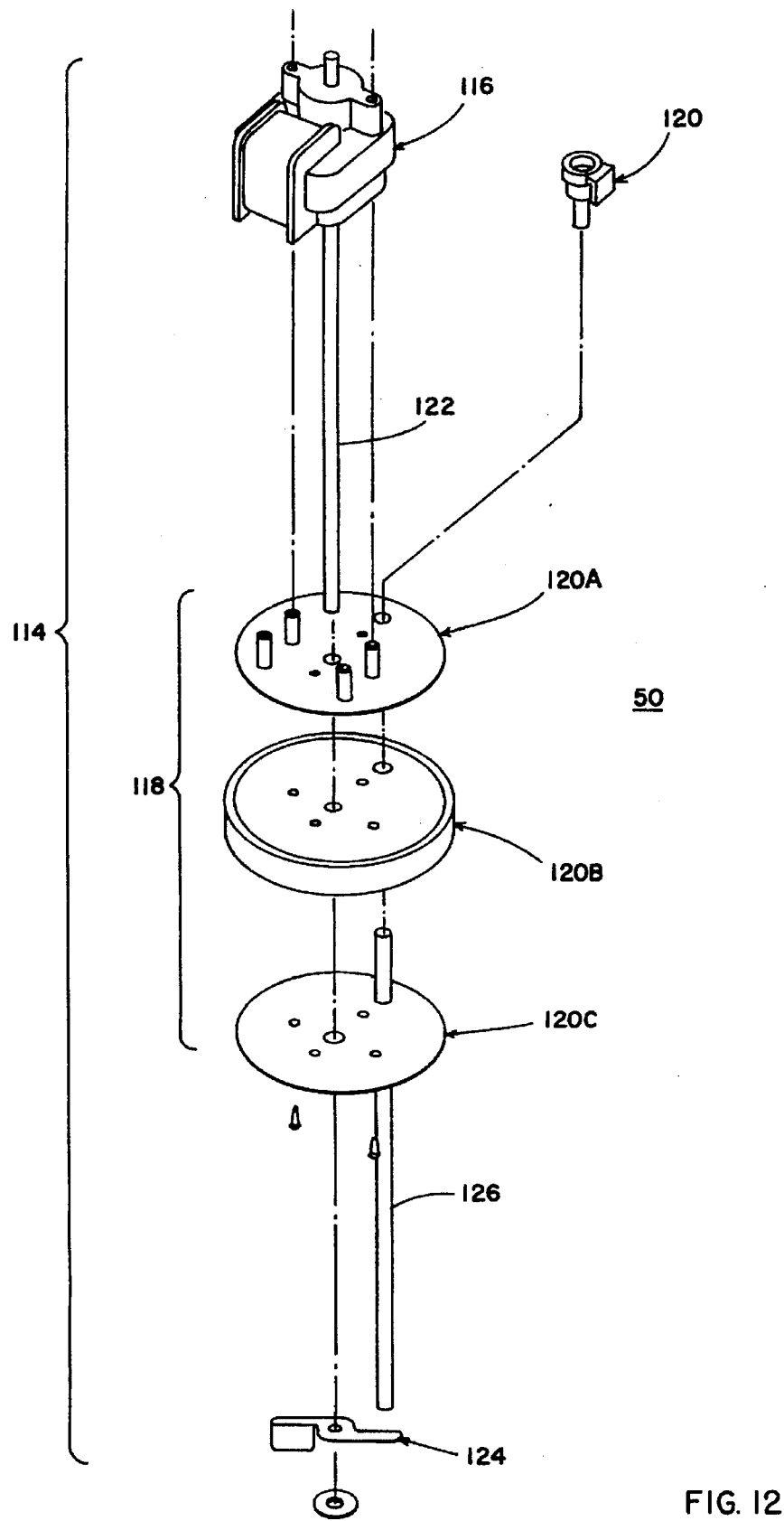
FIG. 12 is an exploded perspective view of a flavor storage container according to the invention.

Each flavor storage container 50 includes a container 51, for storing a flavoring mixture, and a mixer 114 (FIG. 12). Mixer 114 includes a motor 116 mounted to a cap assembly 118 made up of disk members 120a, 120b, and 120c which are maintained in sealing arrangement with the container 51. Alternatively, cap assembly 118 may be a unitary molded member. Motor 116 includes an elongated shaft 122 having an agitator 124 mounted on an opposite end thereof. A fill tube 126 extends through cap assembly 118 and is engaged by a fill member 120. Motor 116 is selectively operated by control 26 in order to maintain the constituents of the flavoring in proper suspension. Preferably, control 26 energizes each mixer motor 116 on a periodic basis, such as once a day, every 12 hours, or the like.

Thus, is seen that the present invention provides a unique popcorn dispensing apparatus which produces consistent batches of high quality product with a relatively short dispense cycle. The high quality vend is produced irrespective of machine usage including a sequence of back-to-back vends, such as could occur during intermission at a theater, or the like; or usage including sitting idle for lengthy periods of time. In all circumstances, the machine immediately responds to a purchaser by promptly producing a batch of high quality popcorn.

Changes and modifications in the specifically described embodiments can be carded out without departing from the principles of the invention. For example, the unique dispenser disclosed herein for dispensing uncooked corn kernels to a cooker in a popcorn vending apparatus may have other applications. Such dispenser may be used to dispense coffee beans to a grinder in a beverage vending apparatus, dispense toppings in an ice cream vending apparatus, or other such applications. The protection afforded the invention is intended to be limited only by the scope of the appended claims, as interpreted according to the principles of patent law including the doctrine of equivalents.

The embodiments of the invention in which an exclusive property or privilege is claimed are defined as follows:

1. A popcorn vending apparatus, comprising:
    a cup dispenser for dispensing a cup in an area accessible by a purchaser;
    a cooker assembly for cooking corn kernels and dispensing cooked kernels to a cup in said area;
    a corn dispenser for dispensing a measured quantity of corn to said cooker, said dispenser including a hopper and a transporting mechanism for transporting a measured quantity of corn from said hopper to said cooker, said transporting mechanism including a tubular member and an open spiral in said tubular member; and
    a precision drive for rotating said open spiral a predetermined number of revolutions or portions of revolutions wherein said drive includes a motor, a shaft encoder and a control receiving an input from said encoder and providing an output for energizing said motor.

2. The popcorn vending apparatus in claim 1 wherein said open spiral has a low-friction surface finish.

3. The popcorn vending apparatus in claim 1 wherein said open spiral is formed from wire having a cross-sectional shape that is one of the group consisting of circular, square, or rectangular.

4. The popcorn vending apparatus in claim 1 wherein said tubular member is oriented with a significant vertical component.

5. The popcorn vending apparatus in claim 4 wherein said open spiral has a low-friction surface finish.

6. The popcorn vending apparatus in claim 4 wherein said open spiral is formed from wire having a cross-sectional shape that is one of the group consisting of circular, square, or rectangular.

7. The popcorn vending apparatus in claim 1 wherein said tubular member is made of a translucent material.

8. A popcorn vending apparatus, comprising:
    a cup dispenser for dispensing a cup in an area accessible by a purchaser;
    a cooker assembly for cooking corn kernels and dispensing cooked kernels to a cup in said area; and
    a corn dispenser located below said cooker assembly for dispensing a measured quantity of corn to said cooker, said dispenser including a hopper and a transporting mechanism for transporting a measured quantity of corn from said hopper to said cooker, said transporting mechanism including a tubular member oriented with a significant vertical component, and which extends between said hopper and said cooker assembly an auger in said tubular member, and a precision drive for rotating said auger a predetermined number of revolutions or portions of revolutions.

9. The popcorn vending apparatus in claim 8 wherein said tubular member is made of a translucent material.

10. A popcorn vending apparatus, comprising:
    a cup dispenser for dispensing a cup in an area accessible by a purchaser:
    a cooker assembly for cooking corn kernels and dispensing cooked kernels cup in said area;
    a corn dispenser for dispensing a measured quantity of corn to said cooker, said dispenser including a hopper and a transporting mechanism for transporting a measured quantity of corn from said hopper to said cooker, said transporting mechanism including a tubular member, an auger in said tubular member, and a precision drive for rotating said auger a predetermined number of revolutions or portions of revolutions, and said drive including a motor, a shaft encoder, and a control receiving an input from said encoder and providing an output for energizing said motor.

11. A popcorn vending apparatus, comprising:
    a cup dispenser for dispensing a cup in an area accessible by a purchaser;
    a cooker assembly for cooking corn kernels and dispensing cooked kernels to a cup in said area;
    a corn dispenser for dispensing a measured quantity of corn to said cooker; and
    a flavor dispenser for dispensing flavoring in a cup in said area, said flavor dispenser including a dispensing head and a support for moving said head over a cup in said dispensing area.

12. The popcorn vending apparatus in claim 11 wherein said head is moved in a particular pattern.

13. The popcorn vending apparatus in claim 12 wherein said pattern is substantially circular.

14. The popcorn vending apparatus in claim 11 wherein said support includes a stationary bracket, a motor mounted to said stationary bracket, an arm mounted to said bracket, and a crank between said motor and one end of said arm, said head mounted to an opposite end of said arm.

15. The popcorn vending apparatus in claim 14 wherein said arm is mounted to said bracket for a rotational sliding motion.

16. The popcorn vending apparatus in claim 15 including a control for said motor, said control positioning said arm in a home position covering a portion of said cup dispenser between vends of popcorn in order to inhibit tampering with said cup dispenser.

17. The popcorn vending apparatus in claim 14 wherein said flavor dispenser further includes:
    a pump;
    one or more flavor storage containers;
    a mixer inside each of said storage containers;
    a motor connected to said mixer which turns said mixer when activated; and
    a controller which intermittently activates said motor.

18. The popcorn vending apparatus in claim 11 including a control for said support, said control positioning said support in a home position covering a portion of said cup dispenser between vends of popcorn in order to inhibit tampering with said cup dispenser.

19. The popcorn vending apparatus in claim 18 including an enlarged portion of said support positioned to cover said potion of said cup dispenser.

20. The popcorn vending apparatus in claim 19 wherein said enlarged portion has a returned flange.

21. The popcorn vending apparatus in claim 11 wherein said flavor dispenser further includes:
   a pump;
   one or more flavor storage containers;
   a mixer inside of each of said storage containers;
   a motor connected to said mixer which turns said mixer when activated; and
   a controller which intermittently activates said motor.

22. A popcorn vending apparatus, comprising:
   a cup dispenser for dispensing a cup in an area accessible by a purchaser;
   a cooker assembly for cooking corn kernels and dispensing cooked kernels to a cup in said area; said cooker assembly including a vessel, a first heater and a fan for supplying heat to said vessel in quantities sufficient to cook said corn kernels;
   a corn dispenser for dispensing a measured quantity of corn to said cooker;
   a second heater of lower power than said first heater, said second heater substantially continually maintaining said cooker assembly above room temperature but below cooking temperature so as to decrease the warmup period of said cooker assembly; and
   a control for said first and second heaters and said fan, wherein said control modulates said fan in a manner that maintains a desired temperature in said vessel during cooking of corn.

23. The popcorn vending apparatus of claim 22 wherein said control modulates said fan according to a predetermined pattern.

24. The popcorn vending apparatus of claim 22 wherein said control modulates said fan according to the temperature in said vessel.

25. The popcorn vending apparatus in claim 24 including a thermostat to monitor the temperature of said vessel.

26. The popcorn vending apparatus in claim 24 including a monitor to monitor the power supplied to said heater.

27. A popcorn vending apparatus, comprising:
   a cup dispenser for dispensing a cup in an area accessible by a purchaser;
   a cooker assembly for cooking corn kernels and dispensing cooked kernels to a cup in said area, said cooker assembly including a vessel, a heater, and a fan for supplying heat to said vessel;
   a corn dispenser for dispensing a measured quantity of corn to said cooker;
   a control for said heater and said fan, wherein said control modulates said fan in a manner that maintains a desired temperature in said vessel during cooking of corn; and
   a flavor dispenser for dispensing flavor to a cup in said area and a flavor storage container connected with said flavor dispenser in a manner that the contents of said storage container are supplied to said flavor dispenser, said storage container including a mixer in order to mix the contents of said storage container.

28. The popcorn vending apparatus in claim 27 wherein said control intermittently actuates said mixer.

29. A popcorn vending apparatus, comprising:
   a cup dispenser for dispensing a cup in an area accessible by a purchaser;
   a cooker assembly for cooking corn kernels and dispensing cooked kernels to a cup in said area;
   a corn dispenser for dispensing a measured quantity of corn to said cooker;
   a flavor dispenser for dispensing flavoring in a cup in said area;
   a flavor storage container; and
   a pump connected with said flavor dispenser and with said storage container in a manner that the contents of said storage container are supplied to said flavor dispenser by said pump;
   said storage container including a mixer in order to mix the contents of said storage container, a motor connected to said mixer, and a control which intermittently actuates said mixer.

30. A vending apparatus material dispenser comprising a hopper and a transport mechanism for transporting a measured quantity of a material from said hopper to a remote location, said transport mechanism including a tubular member, an open spiral in said tubular member, a precision drive for rotating said open spiral a predetermined number of revolutions or portions of revolutions, a motor, a shaft encoder and a control receiving an input from said encoder and providing an output for energizing said motor.

31. The vending apparatus dispenser in claim 30 wherein said tubular member has a particular inner diameter and wherein said open spiral has an outer diameter that is substantially equal to said inner diameter of said tubular member.

32. The vending apparatus dispenser in claim 30 wherein said tubular member is made of a translucent material.

33. The vending apparatus dispenser in claim 30 wherein said open spiral has a low-friction surface finish.

34. The vending apparatus dispenser in claim 30 wherein said open spiral is formed from wire having a cross-sectional shape that is one of the group consisting of circular, square, or rectangular.

35. The vending apparatus dispenser in claim 30 wherein said tubular member is oriented with a significant vertical component.

* * * * *

UNITED STATES PATENT AND TRADEMARK OFFICE
CERTIFICATE OF CORRECTION

PATENT NO. : 5,657,684
DATED : August 19, 1997
INVENTOR(S) : Peter Chaikowsky

It is certified that error appears in the above-identified patent and that said Letters Patent is hereby corrected as shown below:

Column 7, line 9:
"," should be --,--.

Column 7, line 14:
"carded" should be --carried--.

Column 8, line 5:
"component, and" should be --component and--.

Column 8, line 6:
After "assembly", insert --,--.

Column 8, line 14:
":" should be --;--.

Column 8, line 16:
After "kernels", insert --to a--.

Column 9, line 6:
"potion" should be --portion--.

Column 9, line 22:
"," should be --,--.

Column 9, line 56:
":" should be --;--.

Signed and Sealed this

Fourteenth Day of December, 1999

Q. TODD DICKINSON

*Attest:*

*Attesting Officer*        Acting Commissioner of Patents and Trademarks